United States Patent
Sago et al.

(10) Patent No.: US 7,329,314 B2
(45) Date of Patent: Feb. 12, 2008

(54) INK FOR INK-JET RECORDING

(75) Inventors: Hiromitsu Sago, Tokai (JP); Michiko Aoyama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 11/681,291

(22) Filed: Mar. 2, 2007

(65) Prior Publication Data

US 2007/0215002 A1    Sep. 20, 2007

(30) Foreign Application Priority Data

Mar. 20, 2006  (JP)  ............... 2006-076026

(51) Int. Cl.
  *C09D 11/00*  (2006.01)
  *C09D 11/02*  (2006.01)
  *B41J 2/01*  (2006.01)

(52) U.S. Cl. ............... 106/31.27; 106/31.15; 106/31.32; 106/31.49; 106/31.58; 347/100

(58) Field of Classification Search ............ 106/31.27, 106/31.43, 31.49, 31.58, 31.32, 31.15; 347/100
See application file for complete search history.

(56) References Cited

U.S. PATENT DOCUMENTS

| | | | | |
|---|---|---|---|---|
| 6,176,908 | B1 * | 1/2001 | Bauer et al. | 106/31.15 |
| 6,502,931 | B2 | 1/2003 | Udagawa et al. | |
| 6,758,557 | B2 | 7/2004 | Udagawa et al. | |
| 7,147,696 | B2 * | 12/2006 | Aoyama et al. | 106/31.32 |
| 7,252,708 | B2 * | 8/2007 | Aoyama et al. | 106/31.32 |
| 2003/0226474 | A1 * | 12/2003 | Mammen et al. | 106/31.15 |
| 2005/0061199 | A1 * | 3/2005 | Tsuda et al. | 106/31.15 |

FOREIGN PATENT DOCUMENTS

JP    2000033715    2/2000

* cited by examiner

*Primary Examiner*—Helene Klemanski
(74) *Attorney, Agent, or Firm*—Banner & Witcoff, Ltd.

(57) ABSTRACT

An ink for ink-jet recording includes a solvent dye in which a xanthene structure and a phthalide structure are spiro bound to each other. When the ink is stored in an ink cartridge containing a polyurethane foam and ink-jet recording is performed, a stable printing density may be achieved and changes in hue may be avoided.

15 Claims, No Drawings

INK FOR INK-JET RECORDING

CROSS REFERENCE TO RELATED APPLICATION

This application claims priority to Japanese Patent Application No. 2006-76026, filed Mar. 20, 2006, the entire disclosure of which is hereby incorporated by reference.

BACKGROUND

Ink cartridges typically are provided with an ink chamber for storing an ink for ink-jet recording. The ink cartridge typically is detachably installed in an ink-jet recording device. Most ink cartridges accommodate a foam or a porous body having the ability to absorb and hold ink to prevent the leakage of ink from an ejection nozzle of a recording head and to prevent fluctuation of ink liquid level caused by carriage vibration. Foams made of a polymer resin, for example, can be placed within an ink chamber to reduce ink pressure in the ejection nozzle relative to atmospheric pressure (See U.S. Pat. Nos. 6,502,931 and 6,758,557). Polyurethane foams are comparatively easy for controlling the expansion and are inexpensively available.

Solvent dyes have been used in ink-jet recording for improving color developing properties and water resistances of an ink-jet recorded image. One such solvent dye has the structure represented by Formula (1) in which a 9-position of a xanthene structure and a 3-position of a phthalide structure are spiro bound to each other. The dye provides good color developing properties and water resistance.

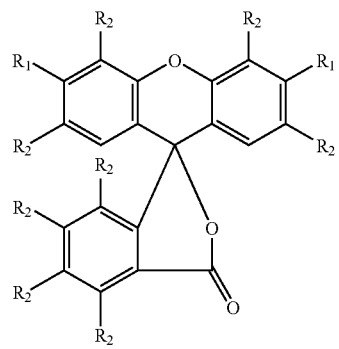

Formula (1)

wherein each $R_1$ independently represents a hydroxyl group or a group represented by Formula (2); and each $R_2$ independently represents a hydrogen atom or a halogen atom.

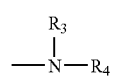

Formula (2)

wherein each $R_3$ and $R_4$ independently represents a hydrogen atom or an alkyl group having from 1 to 3 carbon atoms.

When an ink containing a solvent dye of Formula (1) is filled in an ink chamber of having a polyurethane foam and is allowed to stand for a prolonged time, the image quality of printed material obtained by ink-jet recording may be reduced. It is believed that the dye is adsorbed into the polyurethane foam due to interaction between the solvent dye and the polyurethane foam, which in turn may lower printing density and change hue.

SUMMARY

The present invention is directed to an ink for ink-jet recording comprising a solvent dye of Formula (1). When the ink is stored in an ink cartridge containing a polyurethane foam and ink-jet recording is performed, a stable printing density may be achieved and changes in hue may be avoided.

DETAILED DESCRIPTION

An ink for ink-jet recording may be filled and stored in an ink cartridge containing an ink chamber and a polyurethane foam. In one aspect, the ink may be formulated to minimize or prevent adsorption of the dye onto the polyurethane foam. The ink contains a solvent dye of Formula (1)

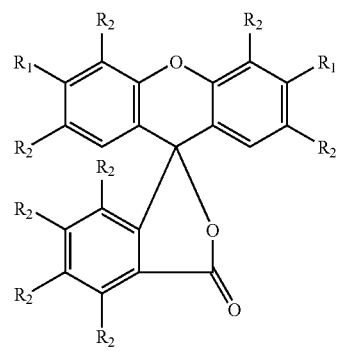

Formula (1)

wherein each $R_1$ independently represents a hydroxyl group or a group represented by Formula (2); and each $R_2$ independently represents a hydrogen atom or a halogen atom, e.g., chlorine, bromine, or iodine.

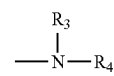

Formula (2)

wherein $R_3$ and $R_4$ independently represent a hydrogen atom or an alkyl group having from 1 to 3 carbon atoms, e.g., methyl, ethyl, propyl, or isopropyl.

When plural $R_1$s, $R_2$s, $R_3$s or $R_4$s are present, these may be all the same or may be different from each other.

In one aspect, the pH of the ink is adjusted to not more than about 3.5. For example, the ink may include a solvent dye of Formula (1), a water-soluble organic solvent, a pH adjuster, and water, wherein the pH of the ink is not more than about 3.5.

When an ink containing solvent dye of Formula (1) is used in an ink chamber of an ink cartridge having a polyurethane foam, problems of lowered printing density and changing hue in printed images formed by ink-jet recording may be minimized or eliminated. While not wanting to be bound by theory, it is believed that adjusting pH to not more than about 3.5 minimizes or prevents adsorption of the solvent dye into the polyurethane foam.

Examples of solvent dyes represented by Formula (1) include those in which each $R_1$ independently represents a hydroxyl group, a mono- or di-lower alkylamino group; and each $R_2$ each independently represents a hydrogen atom, a chlorine atom, a bromine atom or an iodine atom. Another example is one in which $R_2$ in the xanthene structure represents a bromine atom or an iodine atom, and $R_2$ in the phthalide structure represents a hydrogen atom or a chlorine atom. Specific examples of solvent dyes include, but are not limited to, C.I. Solvent Red 43, C.I. Solvent Red 48, C.I. Solvent Red 49, C.I. Solvent Red 72, C.I. Solvent Red 73 and the like, and combinations thereof, represented by the following structural formulae.

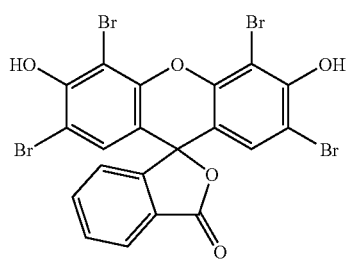
(C.I. Solvent Red 43)

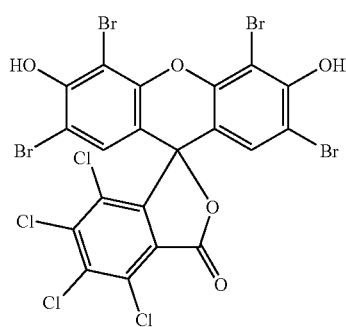
(C.I. Solvent Red 48)

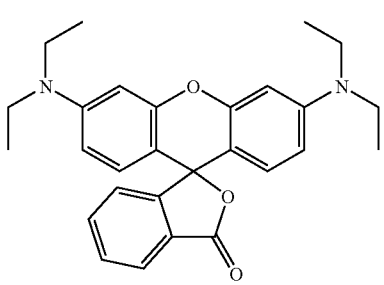
(C.I. Solvent Red 49)

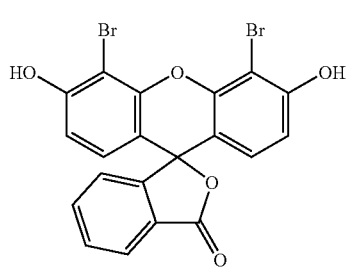
(C.I. Solvent Red 72)

-continued

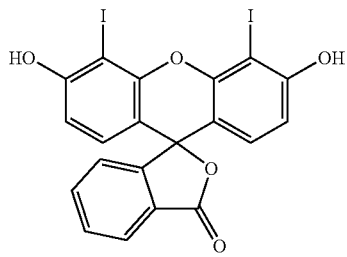
(C.I. Solvent Red 73)

The solvent dye represented by Formula (1) may be used singly or in combination with one or more additional dyes of Formula (1) or other dyes. When the amount of the dye of Formula (1) is too low, a sufficient image density may not be obtained. When the amount of the dye is too high, the ejection stability of the ink tends to be lowered due to nozzle clogging of an ink-jet recording head or the like. Usually, the amount of the solvent dye of Formula (1) ranges from about 0.1 wt % to 2 wt %, or from about 0.3 wt % to 1 wt %, based on the total weight of the ink.

A pH adjuster may be blended to adjust the pH of the ink to not more than about 3.5. Conventional inorganic acids, such as hydrochloric acid, sulfuric acid and the like, or organic acids may be used as a pH adjuster. Organic acids containing a carboxyl group capable of minimizing a change of image density (OD) also may be used. Non-limiting examples of suitable organic acids include malonic acid, succinic acid, fumaric acid, L-tartaric acid, ethylenediaminetetraacetic acid (EDTA), and combinations thereof.

A lower limit of the pH of the ink for ink-jet recording is about 2. This is because when the pH is less than about 2, structure (e.g., a rubber member or a recording head member) that comes into contact with the ink may undergo undesirable deterioration.

While not wanting to be bound by theory, it is believed that by adjusting the pH to not more than about 3.5, adsorption of the dye into the polyurethane foam may be suppressed, thereby avoiding the problems of lowered printing density and change of hue. It is believed that hydrogen ions ($H^+$) act to an oxygen atom of the xanthene structure of the dye, whereby the dye has xanthylium ionicity. As a result, not only do the binding properties between the 2-position and the 3-position of the phthalide structure become weak, but also an oxygen atom at the 2-position of the phthalide structure charges with anionicity. This in turn causes the solubility of the dye in water to increase, so that the dye is hardly absorbed onto the polyurethane foam. Also, when an organic acid containing a carboxyl group is used as the pH adjuster, the carboxyl group of the organic acid further acts to a nitrogen atom of a urethane bond of the polyurethane foam, thereby further inhibiting the adsorption of the dye onto the polyurethane foam.

The water-soluble organic solvent constituting the ink for ink-jet recording of the invention may be classified into a humectant having an effect for principally preventing the ink from drying in the nozzle tip part of the ink-jet head and a penetrant capable of fastening the drying velocity on a recording paper.

Conventionally known humectants may be added as the need arises. Examples of the humectant include, but are not limited to, lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones or keto alcohols such as acetone, diacetone alcohol and the like; ethers such as tetrahydrofuran, dioxane and the like; polyalkylene glycols such as polyethylene glycol, polypropylene glycol and the like; alkylene glycols such as ethylene glycol, propylene glycol, butylene glycol, diethylene glycol, triethylene glycol, dipropylene glycol, tripropylene glycol, thiodiglycol, hexylene glycol and the like; glycerin; 2-pyrrolidone; N-methyl-2-pyrrolidone; 1,3-dimethyl-2-imidazolidinone; and the like; and combinations thereof.

The amount of the humectant may be from 0 wt % to about 95 wt %, from about 10 wt % to about 80 wt %, or from about 10 wt % to about 50 wt % based on the total weight of the ink for ink-jet recording.

Conventionally known penetrants may be added as the need arises. Examples of the penetrant include, but are not limited to, ethylene glycol based ethers such as ethylene glycol methyl ether, ethylene glycol ethyl ether, ethylene glycol propyl ether, diethylene glycol methyl ether, diethylene glycol ethyl ether, diethylene glycol propyl ether, triethylene glycol methyl ether, triethylene glycol ethyl ether, triethylene glycol propyl ether, and the like; propylene glycol based ethers such as propylene glycol methyl ether, propylene glycol ethyl ether, propylene glycol propyl ether, dipropylene glycol methyl ether, dipropylene glycol ethyl ether, dipropylene glycol propyl ether, tripropylene glycol methyl ether, tripropylene glycol ethyl ether, tripropylene glycol propyl ether, and the like, and combinations thereof.

With respect to the amount of the penetrant, when the amount is excessively large, the permeability of the ink into recording paper becomes excessively high, thereby possibly causing bleeding. Accordingly, the amount of the penetrant may be from 0 wt % to about 20 wt %, from about 0.1 wt % to about 15 wt %, or from about 1 wt % to about 10 wt % based on the total weight of the ink for ink-jet recording.

Water having a high purity such as ion exchanged water or distilled water may be used as the water constituting the ink for ink-jet recording of the invention. Though the amount of the water in the ink for ink-jet recording may vary over a wide range depending on the dye represented by Formula (1), the water-soluble organic solvent and a composition thereof or desired characteristics of the ink, or the like, it may be from about 10 wt % to 95 wt % or from about 30 wt % to about 90 wt % based on the total weight of the ink for ink-jet recording.

A basic composition of the ink for ink-jet recording of the invention has been described above. In addition, conventionally known various surfactants, viscosity modifiers, surface tension modifiers, preservatives, mildew-proofing agents and anti-corrosives, and so on may be added as the need arises.

The ink for ink-jet recording of the invention may be manufactured by uniformly mixing the dye represented by the general formula (1), the water-soluble organic solvent, the pH adjuster and water and various additives which are optionally blended by the usual way and removing insoluble materials by a microfilter.

When the ink for ink-jet recording as described herein is filled in an ink chamber of an ink cartridge having a polyurethane foam accommodated in the ink chamber and ink-jet recording is performed, the problems of lowering of printing density and a change of hue caused by the adsorption of the dye onto the polyurethane foam, are ameliorated. As a result, an ink-jet printed material with high image quality may be obtained. The polyurethane foam accommodated in the ink chamber of the ink cartridge also may function as an ink absorbing body.

The polyurethane foam usually is a polyurethane foam resulting from poly-condensation of a polyfunctional isocyanate compound containing two or more isocyanate groups in a molecule thereof and a polyol compound containing two or more hydroxyl groups in a molecule thereof while utilizing a known expansion method. Examples of the polyfunctional isocyanate compound include, but are not limited to, toluene diisocyanate (2,4- or 2,6-toluene diisocyanate), diphenylmethane diisocyanate (4,4'- or 2,4'-diphenylmethane diisocyanate), hexamethylene diisocyanate (1,6-hexamethylene diisocyanate) and the like. Examples of the polyol compound include, but are not limited to, polyether polyols such as polyethylene glycol, polypropylene glycol, polytetramethylene ether glycol and the like; polyester polyols synthesized from at least one dicarboxylic acid (for example, succinic acid, adipic acid, pimelic acid, suberic acid, azelaic acid, sebacic acid and the like) and at least one low molecular weight diol (for example, ethylene glycol, propylene glycol, 1,4-butanediol, neopentyl glycol, 1,6-hexanediol, 3-methyl-1,5-pentanediol, 2-methyl-1,8-octanediol, 1,9-nonanediol, 1,10-decanediol and the like); polycarbonate polyols synthesized from at least one dialkyl carbonate (for example, dimethyl carbonate, diethyl carbonate, ethylene carbonate and the like) and at least one low molecular weight diol (for example, ethylene glycol, propylene glycol, 1,4-butanediol, neopentyl glycol, 1,6-hexanediol, 3-methyl-1,5-pentanediol, 2-methyl-1,8-octanediol, 1,9-nonanediol, 1,10-decanediol and the like); polycaprolactone polyols obtainable from ring-opening polymerization of a lactone compound, such as polylactone diol, polymethylvalerolactone diol and the like; and the like.

EXAMPLES

The following examples are provided only to illustrate certain aspects of the description and are not intended to embody the total scope of the invention or any embodiment thereof. Variations of the examples below are intended to be included within the scope of the invention.

Examples 1 to 7

The components summarized in Table 1, other than the acid, were uniformly mixed and stirred. The acid was then added while continuing the stirring. A part of the mixed solution was removed and measured for a pH value using a pH meter (D-51, manufactured by HORIBA, Ltd.). The acid was added until the pH value reached to a value as summarized in Table 1, and the mixed solution was then filtered through a 1-μm membrane filter. The resulting inks for ink-jet recording had a pH value of not more than 3.5 (Examples 1-7).

Comparative Examples 1 to 7

The components summarized in Table 2, other than the acid, were uniformly mixed and stirred. The acid was then added while continuing the stirring. A part of the mixed solution was removed and measured for a pH value by using a pH meter (D-51, manufactured by HORIBA, Ltd.). The acid was added until the pH value reached to a value as summarized in Table 1, and the mixed solution was then filtered through a 1-μm membrane filter. There resulting inks for ink-jet recording had a pH value exceeding 3.5 (Comparative Examples 1 to 7).

Each of the inks for ink-jet recordings of the Examples and Comparative Examples was filled in a desired ink cartridge having an ink chamber having a polyurethane foam accommodated therein and allowed to stand in a thermostatic oven at 60° C. for 7 days. Thereafter, the ink cartridge was installed in a digital multifunction machine mounted with an ink-jet printer (MFC-5100J, manufactured by Brother Industries, Ltd.). A recording sample (a monochromatic color patch) was recorded on plain paper (Xerox Business 4200, manufactured by Xerox Co., Ltd.). The resulting recording sample was subjected to (a) evaluation of a change of OD value and (b) evaluation of a change of hue according to the following evaluation methods.

(a) Evaluation of Change of OD Value:

An optical density (OD) value of the recording sample was measured by using a color reflection densitometer (X-Rite 400, manufactured by X-Rite Inc.). With respect to the recording samples recorded by using each of the inks for ink-jet recording of the Examples or Comparative Examples and recording samples not stored in a thermostatic oven, the measurement was carried out. A rate of change of OD value [(OD value of recording sample after storing in a thermostatic oven)/(OD value not stored in a thermostatic oven)×100] was determined and evaluated according to the following evaluation criteria. The results are shown in Tables 1 and 2.

A: The rate of change of OD value is 90% or more.

B: The rate of change of OD value is 80% or more and less than 90%.

C: The rate of change of OD value is less than 80%.

(b) Evaluation of Change of Hue:

Hue of each of the recording samples was measured by using a spectrophotometer (UV-3100PC, manufactured by Shimadzu Corporation). With respect to the recording samples recorded by using each of the inks for ink-jet recording of the Examples or Comparative Examples and recording samples not stored in a thermostatic oven, the measurement was carried out. The evaluation was carried out on a basis of a color difference between the recording sample after storing in a thermostatic oven and the recording sample not stored in a thermostatic oven according to the following evaluation criteria. The results are shown in Tables 1 and 2.

The "color difference (ΔE)" as referred to herein is a value calculated according to the following expression on a basis of the L*a*b* calorimetric system (color system standardized by Commission Internationale de I'Eclarirage (CIE) in 1976; as defined in JIS Z8729 according to the Japanese Industrial Standards (JIS)).

$$\Delta E = [(\Delta L^*)^2 + (\Delta a^*)^2 + (\Delta b^*)^2]^{1/2}$$

A: The color difference (ΔE) is not more than 3.

C: The color difference (ΔE) exceeds 3.

TABLE 1

| | | | Example | | | | | | |
| --- | --- | --- | --- | --- | --- | --- | --- | --- | --- |
| | | | 1 | 2 | 3 | 4 | 5 | 6 | 7 |
| Ink Composition (parts by weight) | Dye | C.I. Solvent Red 43 | 0.5 | — | — | 0.5 | — | — | 0.5 |
| | | C.I. Solvent Red 49 | — | 0.8 | — | — | 0.8 | — | — |
| | | C.I. Solvent Red 72 | — | — | 1.1 | — | — | 1.1 | — |
| | Humectant | 2-Pyrrolidone | 8.0 | 8.0 | 8.0 | 8.0 | 8.0 | 8.0 | 8.0 |
| | | Glycerin | 22.0 | 22.0 | 22.0 | 22.0 | 22.0 | 22.0 | 22.0 |
| | Penetrant | Triethylene glycol n-butyl ether | 3.0 | 3.0 | 3.0 | 3.0 | 3.0 | 3.0 | 3.0 |
| | Water | Pure water | 66.5 | 66.2 | 65.9 | 66.5 | 66.2 | 65.9 | 66.5 |
| | Acid | Hydrochloric acid | PQ | — | — | — | — | — | — |
| | | Sulfuric acid | — | PQ | — | — | — | — | — |
| | | Malonic acid | — | — | PQ | — | — | — | — |
| | | Succinic acid | — | — | — | PQ | — | — | — |
| | | Fumaric acid | — | — | — | — | PQ | — | — |
| | | L-Tartaric acid | — | — | — | — | — | PQ | — |
| | | Ethylenediaminetetraacetic acid | — | — | — | — | — | — | PQ |
| — | pH | | 3.0 | 3.1 | 2.7 | 3.5 | 3.0 | 3.2 | 3.5 |
| Evaluation | Change of OD value | | B | B | A | A | A | A | A |
| | Change of hue | | A | A | A | A | A | A | A |

PQ: proper quantity

TABLE 2

| | | | Example | | | | | | |
| --- | --- | --- | --- | --- | --- | --- | --- | --- | --- |
| | | | 1 | 2 | 3 | 4 | 5 | 6 | 7 |
| Ink Composition (parts by weight) | Dye | C.I. Solvent Red 43 | 0.5 | 0.5 | — | — | 0.5 | — | — |
| | | C.I. Solvent Red 49 | — | — | 0.8 | — | — | 0.8 | — |
| | | C.I. Solvent Red 72 | — | — | — | 1.1 | — | — | 1.1 |
| | Humectant | 2-Pyrrolidone | 8.0 | 8.0 | 8.0 | 8.0 | 8.0 | 8.0 | 8.0 |
| | | Glycerin | 22.0 | 22.0 | 22.0 | 22.0 | 22.0 | 22.0 | 22.0 |

TABLE 2-continued

|  |  | Example |  |  |  |  |  |  |
|---|---|---|---|---|---|---|---|---|
|  |  | 1 | 2 | 3 | 4 | 5 | 6 | 7 |
| Penetrant | Triethylene glycol n-butyl ether | 3.0 | 3.0 | 3.0 | 3.0 | 3.0 | 3.0 | 3.0 |
| Water | Pure water | 66.5 | 66.5 | 66.2 | 65.9 | 66.5 | 66.2 | 65.9 |
| Acid | Sulfuric acid | — | PQ | — | — | — | — | — |
|  | Malonic acid | — | — | PQ | — | — | — | — |
|  | Succinic acid | — | — | — | PQ | — | — | — |
|  | Fumaric acid | — | — | — | — | PQ | — | — |
|  | L-Tartaric acid | — | — | — | — | — | PQ | — |
|  | Ethylenediaminetetraacetic acid | — | — | — | — | — | — | PQ |
| — | pH | 6.4 | 3.8 | 4.0 | 4.2 | 3.7 | 4.0 | 3.9 |
| Evaluation | Change of OD value | C | C | C | C | C | C | C |
|  | Change of hue | C | C | C | C | C | C | C |

PQ: proper quantity

The inks for ink-jet recording of Examples 1 to 7 having a pH value of not more than 3.5 brought good results in both the evaluation of change of OD value and the evaluation of change of hue. And they were small in a lowering of printing density and a change of hue due to the storage in a thermostatic oven.

On the other hand, the inks for ink-jet recording of Comparative Examples 1 to 7 having a pH value exceeding 3.5 brought poor results in both the evaluation of change of OD value and the evaluation of change of hue.

The invention is not limited to the embodiments described in the Examples, which are provided for illustrative purposes only. The material substances, their amounts used, and the conditions of producing them may be varied and modified without departing from the spirit and the scope of the invention as described herein.

What is claimed is:

1. An ink for ink-jet recording comprising:
   (i) a dye represented by Formula (1)

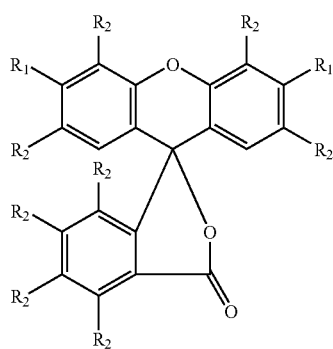

Formula (1)

wherein each $R_1$ independently represents a hydroxyl group or a group represented by Formula (2), and each $R_2$ independently represents a hydrogen atom or a halogen atom

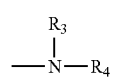

Formula (2)

wherein each $R_3$ and $R_4$ independently represents a hydrogen atom or an alkyl group having from 1 to 3 carbon atoms;

(ii) a water-soluble organic solvent;
   (iii) a pH adjuster; and
   (iv) water;
   wherein a pH of the ink is not more than about 3.5.

2. The ink according to claim 1, wherein the pH adjuster is an organic acid containing a carboxyl group.

3. The ink according to claim 2, wherein the organic acid containing a carboxyl group is selected from the group consisting of malonic acid, succinic acid, fumaric acid, L-tartaric acid, ethylenediaminetetraacetic acid, and combinations thereof.

4. The ink according to claim 1, wherein the water-soluble organic solvent is selected from the group consisting of lower alcohols, amides, ketones, keto alcohols, ethers, polyalkylene glycols, alkylene glycols, and combinations thereof.

5. The ink according to claim 4, wherein the water-soluble organic solvent is selected from the group consisting of methyl alcohol, ethyl alcohol, n-propyl alcohol, isopropyl alcohol, n-butyl alcohol, sec-butyl alcohol, tert-butyl alcohol, dimethylformamide, dimethylacetamide, acetone, diacetone alcohol, tetrahydrofuran, dioxane, polyethylene glycol, polypropylene glycol, ethylene glycol, propylene glycol, butylene glycol, diethylene glycol, triethylene glycol, dipropylene glycol, tripropylene glycol, thiodiglycol, hexylene glycol, and combinations thereof.

6. The ink according to claim 1, wherein the water-soluble organic solvent is selected from the group consisting of ethylene glycol based ethers, propylene glycol based ethers, and combinations thereof.

7. The ink according to claim 6, wherein the water-soluble organic solvent is selected from the group consisting of ethylene glycol methyl ether, ethylene glycol ethyl ether, ethylene glycol propyl ether, diethylene glycol methyl ether, diethylene glycol ethyl ether, diethylene glycol propyl ether, triethylene glycol methyl ether, triethylene glycol ethyl ether, triethylene glycol propyl ether, propylene glycol methyl ether, propylene glycol ethyl ether, propylene glycol propyl ether, dipropylene glycol methyl ether, dipropylene glycol ethyl ether, dipropylene glycol propyl ether, tripropylene glycol methyl ether, tripropylene glycol ethyl ether, tripropylene glycol propyl ether, and combinations thereof.

8. The ink according to claim 1, wherein the water-soluble organic solvent is selected from the group consisting of glycerin, 2-pyrrolidone, N-methyl-2-pyrrolidone, 1,3-dimethyl-2-imidazolidinone, and combinations thereof.

9. The ink according to claim 1, wherein the dye is selected from the group consisting of C.I. Solvent Red 43, C.I. Solvent Red 48, C.I. Solvent Red 49, C.I. Solvent Red 72, C.I. Solvent Red 73, and combinations thereof.

10. An ink cartridge for use with an ink-jet recording apparatus, the ink cartridge comprising a foam or porous body for holding ink and preventing leakage of ink from an ejection nozzle of a recording head, wherein the ink cartridge is filled with ink comprising:

(i) a dye represented by Formula (1)

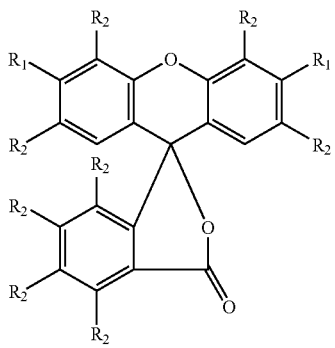

Formula (1)

wherein each $R_1$ independently represents a hydroxyl group or a group represented by Formula (2), and each $R_2$ independently represents a hydrogen atom or a halogen atom

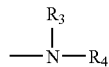

Formula (2)

wherein each $R_3$ and $R_4$ independently represents a hydrogen atom or an alkyl group having from 1 to 3 carbon atoms;

(ii) a water-soluble organic solvent;
(iii) a pH adjuster; and
(iv) water;

wherein a pH of the ink is not more than about 3.5.

11. The ink cartridge according to claim 10, wherein the foam comprises polyurethane.

12. A method of minimizing or preventing adsorption of an ink into a foam or porous body in an ink cartridge for use with an ink-jet recording device, wherein the ink comprises a dye represented by Formula (1)

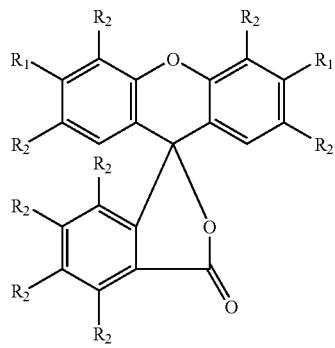

Formula (1)

wherein each $R_1$ independently represents a hydroxyl group or a group represented by Formula (2), and each $R_2$ independently represents a hydrogen atom or a halogen atom

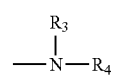

Formula (2)

wherein each $R_3$ and $R_4$ independently represents a hydrogen atom or an alkyl group having from 1 to 3 carbon atoms;

the method comprising adjusting a pH of the ink to not more than about 3.5.

13. The method according to claim 12, wherein the foam comprises polyurethane.

14. The method according to claim 12, wherein the pH is adjusted by adding a pH adjuster comprising an organic acid containing a carboxyl group.

15. The method according to claim 12, wherein the organic acid containing a carboxyl group is selected from the group consisting of malonic acid, succinic acid, fumaric acid, L-tartaric acid, ethylenediaminetetraacetic acid, and combinations thereof.

* * * * *